United States Patent [19]

Baykal

[11] Patent Number: 6,065,466
[45] Date of Patent: *May 23, 2000

[54] BARBECUE AND PATIO TABLE COMBINATION

[75] Inventor: Michael H. Baykal, Rancho Sante Fe, Calif.

[73] Assignee: Masagril, LLC, Santee, Calif.

[ * ] Notice: This patent is subject to a terminal disclaimer.

[21] Appl. No.: 09/078,096

[22] Filed: May 12, 1998

Related U.S. Application Data

[63] Continuation-in-part of application No. 08/735,936, Oct. 23, 1996, Pat. No. 5,775,315, which is a continuation-in-part of application No. 08/058,401, Aug. 14, 1996, Pat. No. Des. 389,009.

[51] Int. Cl.[7] ........................................... F24C 1/16
[52] U.S. Cl. ..................... 126/41 R; 126/25 R; 126/9 R; 126/26; 126/50; 126/40; 108/50.12; 108/50.13
[58] Field of Search ................................ 126/25 A, 25 R, 126/9 R, 26, 242, 243, 245, 9 B, 8, 39 B, 50, 40, 41 R, 214 A; 108/50, 25, 50.11, 50.13, 50.12; D7/402

[56] References Cited

U.S. PATENT DOCUMENTS

| D. 131,939 | 4/1942 | Robinson . | |
|---|---|---|---|
| D. 253,931 | 1/1980 | Devischer et al. | D7/107 |
| D. 262,427 | 12/1981 | Boston et al. | D7/107 |
| D. 270,987 | 10/1983 | Scheufler | D7/335 |
| D. 286,002 | 10/1986 | Brix | D7/332 |
| D. 350,045 | 8/1994 | Stuart | D7/332 |
| D. 361,467 | 8/1995 | Kabayama | D7/334 |
| 865,992 | 9/1907 | Best . | |
| 2,079,225 | 5/1937 | Sabaneeff . | |
| 2,094,915 | 10/1937 | Dawson | 126/29 |
| 3,217,634 | 11/1965 | Fox | 126/25 A |
| 3,327,698 | 6/1967 | Leslie | 126/25 A |
| 3,327,699 | 6/1967 | Uden | 126/8 |
| 3,491,744 | 1/1970 | Von Kohorn et al. . | |
| 4,616,626 | 10/1986 | Kwon Soon | 126/39 K |
| 4,840,128 | 6/1989 | McFarlane et al. | 108/50 |
| 4,909,235 | 3/1990 | Boetcker | 126/25 R |
| 5,421,271 | 6/1995 | Sui | 108/50 |
| 5,775,315 | 7/1998 | Baykal | 126/25 R |

FOREIGN PATENT DOCUMENTS 1570591  6/1969  France .................. 126/25 R

*Primary Examiner*—Carl D. Price
*Attorney, Agent, or Firm*—John D. Buchaca; Henri J. A. Charmasson

[57] ABSTRACT

A patio table and outdoor barbecue combination in which a burner pit is positioned in the upper section of a table central, hollow-core pedestal, and can be covered when not in use by a lid flush with the upper surface of the table slab. In the charcoal-fuel embodiment, the cooking griddle, charcoal plate, and ash-collecting bucket are held at successively space-apart levels within the inner wall of the burner pit which has an inverted frusto-conical shape. In the gas-fired embodiment, a small propane canister is conveniently located under the table top.

14 Claims, 2 Drawing Sheets

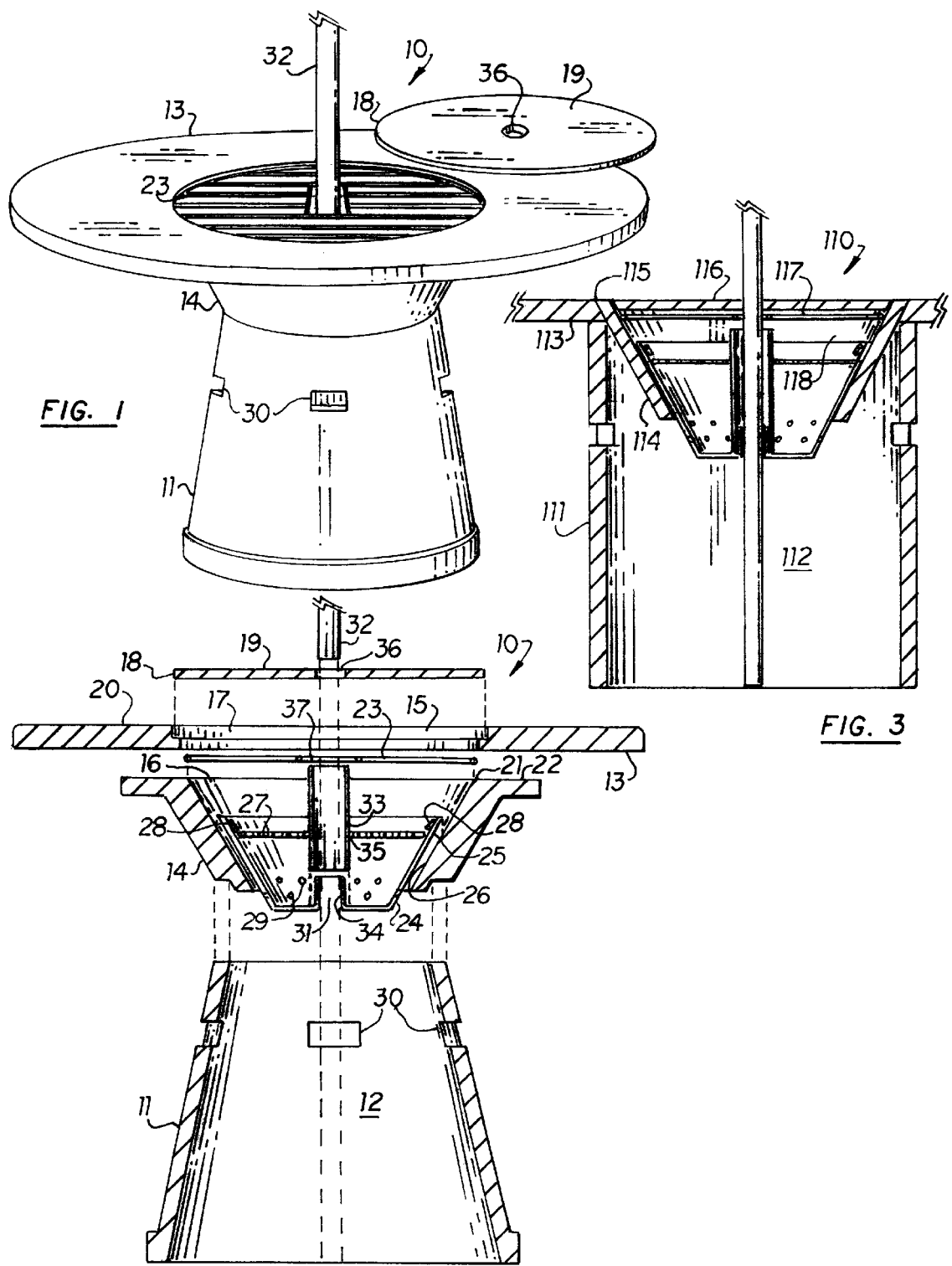

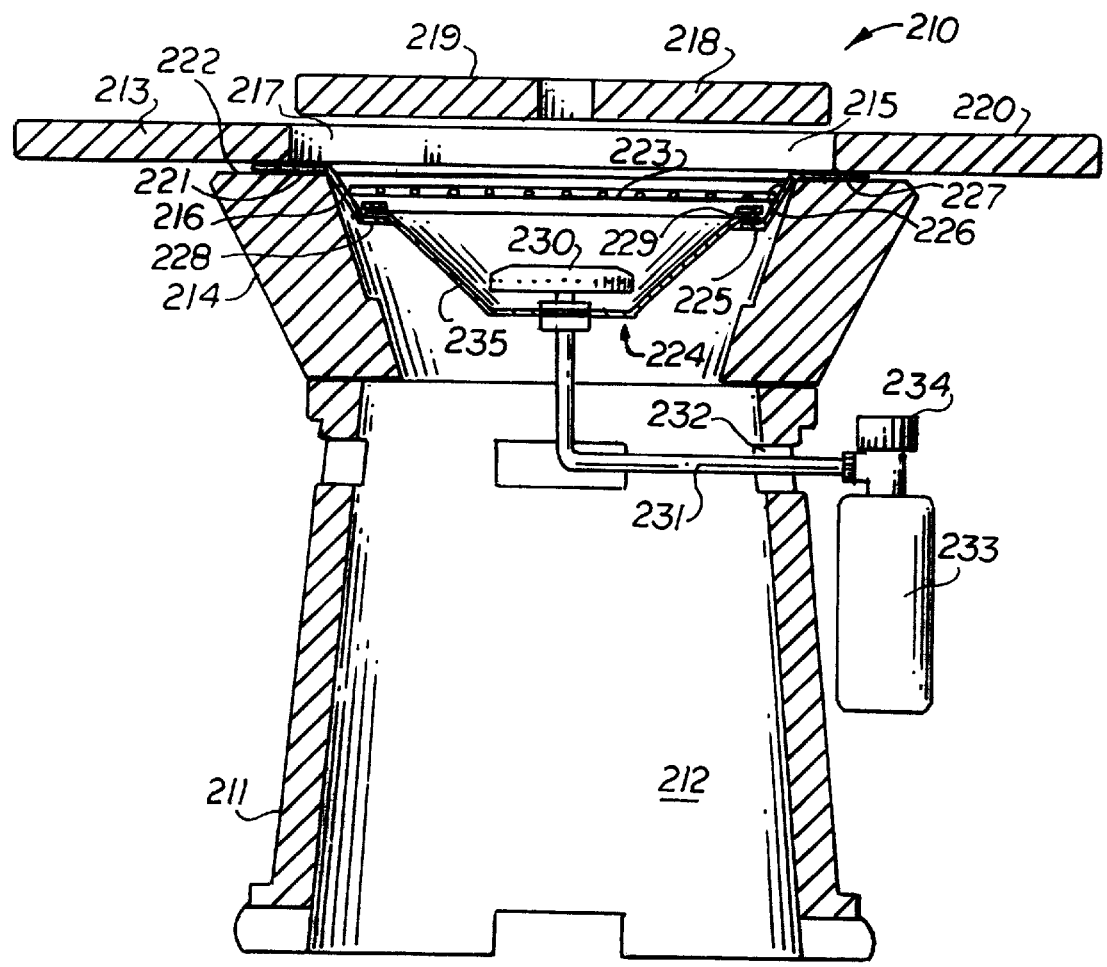
FIG. 4
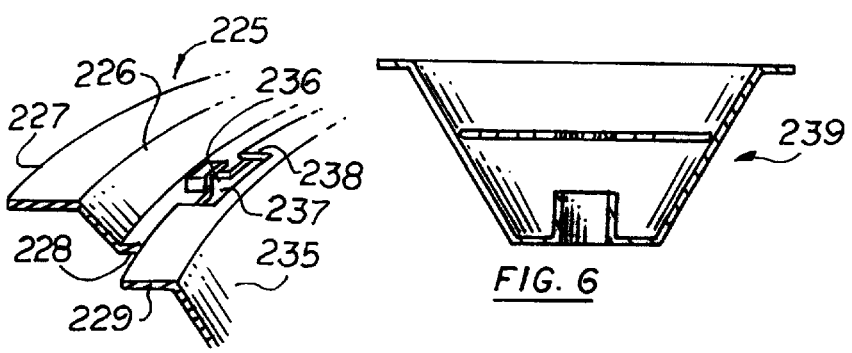
FIG. 5
FIG. 6
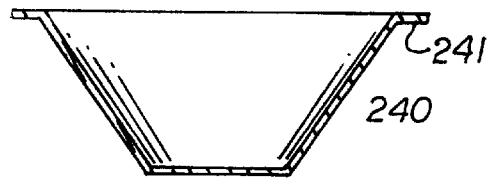
FIG. 7

6,065,466

BARBECUE AND PATIO TABLE COMBINATION

PRIOR APPLICATION

This Application is a Continuation-in-part of Application Ser. No. 08/735,936 filed Oct. 23, 1996 now U.S. Pat. No. 5,775,315, a continuation-in-part of application Ser. No. 58,401 filed Aug. 14, 1996, now Design U.S. Pat. No. 389,009.

FIELD OF THE INVENTION

This invention relates to patio furniture and outdoor cooking installations.

BACKGROUND OF THE INVENTION

Barbecuing structures made of masonry or movable barbecue carts are ubiquitous features of backyards, patios and balconies. On balconies and in certain patios there is often not enough space for a table, chairs and a barbecue.

Barbecue installations are not only bulky but also unsightly and hard to keep clean.

This invention results from an attempt to address the bulkiness, lack of aesthetic and unwieldiness of barbecue installations of the prior art.

SUMMARY OF THE INVENTION

The principal and secondary objects of this invention are to combine a eating table with a cooking grill in an esthetically attractive structure where the cooking elements can be conveniently accessed for easy cleaning.

These and other valuable objects are achieved by a table and barbecue combination in which a charcoal or gas cooker pit is positioned in the upper section of a hollow-core central pedestal of the table, and can be covered when not in use. The inverted frusto-conical shape of the barbecue cooker pit allows for a convenient arrangement of the cooking griddle, gas-burner or charcoal plate and ash-collecting bucket where they are held out of sight, but can be quickly removed for cleaning and maintenance.

BRIEF DESCRIPTION OF THE DRAWING

FIG. 1 is a perspective view of the preferred charcoal-fueled embodiment of the invention;

FIG. 2 is an exploded, median, cross-sectional view thereof;

FIG. 3 is a partial median, cross-sectional view of a first alternate embodiment of the invention;

FIG. 4 is a median vertical cross-sectional view of a second alternate embodiment of the invention;

FIG. 5 is a detail view of the pan-locking mechanism;

FIG. 6 is a cross-sectional view of a coal burner; and

FIG. 7 is a cross-sectional view of a ice bucket insert.

DESCRIPTION OF THE PREFERRED EMBODIMENT OF THE INVENTION

Referring now to the drawing, there is shown a patio table and barbecue combination 10 made according to the invention. The structure comprises a frusto-conical pedestal 11 having a hollow core 12, a circular table top slab 13, and a pit-liner 14 interposed between the pedestal 11 and slab 13. The pit-liner 14 has the general shape of an inverted conical frustum. The slab 13 has a central void 15 which is slightly larger than the opening 16 at the upper rim of the pit-liner.

The rim around the central void of the slab forms a ledge 17 dimensioned to hold the edge of a circular lid 18. When the lid 18 is positioned upon the ledge 17, its top surface 19 lies flush with the top surface 20 of the slab 13. The void 15 in the center of the slab exposes a narrow ridge 21 at the top rim surface 22 of the pit-liner 14 upon which rests the outer edge of a cooking griddle 23. Nested inside the pit-liner 14 is a ash-collecting bucket 24 also having the general shape of an inverted conical frustum. An upper portion 25 of the bucket 24 is retained within the pit-liner by contact of its outer surface which is substantially parallel and coaxial with an inner, lower surface section 26 of the pit-liner 14. Resting against the inner wall of an upper section of the bucket 24 is a perforated charcoal plate 27. Holding handles 28 are mounted against the inner, upper rim of the bucket 24 to facilitate its extraction from the structure. The bucket 24 has a plurality of venting ports 29 around its lower half. Venting ports 30 are also provided through the upper section of the pedestal 11. A rimmed hole 31 is proved in the center of the bucket bottom. This hole is dimensioned to accommodate the pole 32 of a parasol. A sleeve 33 has its lower end engaged over the rim 34 of the bucket bottom hole 31 and extends upwardly through a central opening 35 in the charcoal plate 27 slightly above the upper rim of the bucket 24. The lid 18 and the cooking griddle 23 also have central holes 36, 37 for engagement by the parasol pole 32. The sleeve 33 and the rim 34 prevent the ashes and grease accumulating at the bottom of the bucket or the charcoal resting on the plate 27 from falling out through the holes 31 of the bucket into the pedestal 11 whether or not the parasol pole 32 is in place.

The pedestal 11 for the table top 13, the lid 18 and the pit-liner 14 are preferably made entirely of masonry material such as a fiber-reinforced cement. The bucket 24, charcoal plate 27, cooking griddle 23 and sleeve 33 are preferably made of metal.

FIG. 3 illustrates a first alternate embodiment 110 of the invention in which a cylindrical pedestal 111 with a hollow-core 112 directly supports the table top slab 113, and where the inverted frusto-conical pit-liner 114 is supported by the inner edges of the slab central opening rather than by the pedestal. The lid 116 and the cooking griddle 117 rest against the inwardly slanted inner wall 118 of the pit-liner 114.

All other aspects of this first alternate embodiment 110 are similar to the corresponding ones in the earlier described preferred embodiment 10.

Illustrated in FIG. 4, is a second alternate embodiment 210 of the invention. This embodiment is structurally very similar to the first embodiment 10, and comprises an optional pedestal 211 having a hollow core 212, a table top slab 213, and an inverted frustro-conically shaped pit-liner 214 positioned between the pedestal 211 and the table top slab 213. The opening 215 in the center of the table top slab is slightly larger than the opening 216 at the upper rim of the pit-liner so that the ledge 217 of the table top slab opening can cradle a lid 218 having a top surface 219 flush with the top surface 220 of the table top slab. The outer edge of the lid are supported by a narrow ridge 221 at the top rim surface 222 of the pit liner 214. A cooking grill 223 and a cooker 224 are supported by a circular frame 225 just below the central opening 215 of the table top slab.

The outer rim 226 of the frame 225 has a flange 227 projecting radially and outwardly between the top rim surface 222 of the pit liner and a marginal part of the table top slab 213. The weight of the table top slab solidly immobilizes the frame 225. Along the inner rim of the frame is another flange 228 projecting horizontally and inwardly. This flange is shaped and positioned to hold a corresponding support flange 229 on the periphery of the cooker 224. The cooker comprises a gas-fired burner 230 fed by a gas line 231 passing through a vent hole 232 in the wall of the pedestal 211 or, alternatively the pit-liner 214 and leading to a propane canister 233 having a control valve 234 and located under the table top slab 213.

As more specifically illustrated in FIG. 5, the enclosure 235 of the gas-fired burner can be interlocked with the frame 225. The interlocking mechanism comprises a slot 236 formed along the inner rim flange 228 of the frame and a small cutout 237 in the support flange of the burner enclosure. The cutout forms a ledge 238 which can be force-locked into the slot 236 by rotating the burner enclosure 235 counter-clockwise. Accordingly, the gas-fired cooker 224 can conveniently be replaced by a ash-bucket 239 essentially similar to the ash-bucket 24 of the earlier described first embodiment of the invention as shown in FIG. 6. Similarly, a ice bucket or dish 240 as illustrated in FIG. 7 having a peripheral flange 241 commensurate with the flange of either the gas-fired cooker 224 or the ash-bucket 239 and similar cutout in its support flange may be conveniently placed within the pit-liner.

The pit liner may be made of various types of masonry materials that provide efficient heat-shielding so that a group of users can comfortably sit around the combination patio table and grill without risk of being burned by contact with the coal-fired cooker. This masonry material may include baked clay, cast concrete with or without a combination of stone aggregates, or other heat-resistant and heat-insulating material.

While the preferred embodiments of the invention have been described, modifications can be made and other embodiments may be devised without departing from the spirit of the invention and the scope of the appended claims.

What is claimed is:

1. A combination patio table and grill which comprises:
    a pit-liner made entirely of heat-resistant and heat insulating material selected from a group consisting of baked clay, concrete and stone aggregate, and having a peripheral wall, an upper rim opening, a top rim surface, and a lower rim opening;
    a table top slab having a section positioned above, and being supported by the top rim surface of said pit-liner, said slab having a central void shaped and dimensioned to substantially match said upper rim opening;
    a cooker held positioned within said pit-liner; and
    a cooking griddle held in a parallel and spaced-apart position above said cooker.

2. The structure of claim 1, wherein said pit-liner has an inverted frusto-conical shaped inner peripheral wall surface.

3. The structure of claim 2 which further comprises a central pedestal having an upper edge and supporting said pit-liner and said slab.

4. The structure of claim 1, wherein said cooker comprises a gas-fired burner.

5. The structure of claim 1 which further comprises a removable lid filling said slab central void.

6. A combination patio table and grill which comprises:
    a pit-liner made of heat-resistant and heat insulating material, and having a peripheral wall, an upper rim opening, a top rim surface, and a lower rim opening;
    a table top slab having a section positioned above, and being supported by the top rim surface of said pit-liner;
    said slab having a central void shaped and dimensioned to substantially match said upper rim opening;
    a cooker held positioned within said pit-liner; and
    a cooking griddle held in a parallel and spaced-apart position above said cooker;
    wherein said pit-liner comprises a frame having a peripheral wall, an outer rim and an inner rim;
    said outer rim comprising a outwardly and horizontally projecting flange shaped and dimensioned to nest between said section of the table top slab and the top rim surface of said pit-liner.

7. The structure of claim 6, wherein said cooker comprises an enclosure having an upper rim shaped and dimensioned to interconnect with the inner rim of said frame.

8. The structure of claim 7, which further comprise an ice-bucket having an upper rim commensurate with the upper rim of said enclosure wherein said ice-bucket may be substituted within said frame for said cooker.

9. The structure of claim 7, which further comprises a locking mechanism between the inner rim of said frame and the upper rim of said enclosure.

10. The structure of claim 7, wherein said cooker comprises a gas-fired burner.

11. The structure of claim 6, wherein said slab and pit-liner are made of a masonry material selected from a group consisting of baked clay, concrete, and stone aggregate.

12. A barbecue grill which comprises:
    a pit-liner made of heat-resistant and heat insulating masonry material, and having a peripheral wall, an upper rim opening, a top rim surface and a lower rim opening and a lower rim edge;
    a table top lid having a section positioned and being supported about the top rim surface of said pit-liner;
    a cooker held positioned within said pit-liner; and
    a cooking griddle held in a parallel and spaced-apart position above said cooker.

13. The structure of claim 12 which further comprise an ice-bucket having an upper rim commersurate with the upper rim of said pit-line wherein said ice-bucket may be substituted within said pit-liner for said cooker.

14. The structure of claim 12, wherein said masonry material is selected from a group consisting of baked clay, concrete, and stone aggregate.

* * * * *